(12) United States Patent
Wieczorek et al.

(10) Patent No.: US 6,452,186 B1
(45) Date of Patent: Sep. 17, 2002

(54) DETECTOR FOR THE DETECTION FOR ELECTROMAGNETIC RADIATION

(75) Inventors: Herfried Wieczorek; Stefan Schneider, both of Aachen; Josef Lauter, Geilenkirchen, all of (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/621,518

(22) Filed: Jul. 21, 2000

(30) Foreign Application Priority Data

Jul. 23, 1999 (DE) ............................................. 19934768

(51) Int. Cl.$^7$ ................................................. G01T 1/00
(52) U.S. Cl. ........................... 250/370.11; 350/214 VT; 378/98.8
(58) Field of Search .................. 378/19, 98.8; 250/367, 250/368, 370.11, 214 VT; 348/162, 216, 342

(56) References Cited

U.S. PATENT DOCUMENTS

| 5,430,298 A | * | 7/1995 | Possin et al. | .......... 250/370.11 |
| 5,517,031 A | * | 5/1996 | Wei et al. | .............. 250/370.08 |
| 6,031,234 A | * | 2/2000 | Albagli et al. | ......... 250/370.11 |

FOREIGN PATENT DOCUMENTS

JP          09043356 A     2/1997          G01T/1/20

\* cited by examiner

*Primary Examiner*—Robert H. Kim
*Assistant Examiner*—Jurie Yun
(74) *Attorney, Agent, or Firm*—John Vodopia

(57) ABSTRACT

The invention relates to a detector for the detection of electromagnetic radiation (6, 9), including scintillators ($S_1$–$S_5$), a photosensor device ($F_1$–$F_5$) and an intermediate layer (10). The optical crosstalk due to multiple reflection in the intermediate layer is prevented in that at least parts of the intermediate layer (10) contain substances absorbing electromagnetic radiation (9).

10 Claims, 1 Drawing Sheet

DETECTOR FOR THE DETECTION FOR ELECTROMAGNETIC RADIATION

BACKGROUND OF THE INVENTION

The invention relates to a detector for the detection of electromagnetic radiation, including scintillators, a photosensor device and an intermediate layer. Detectors of this kind are used for the conversion of, for example X-rays into radiation in the visible light range.

Detectors for, for example, computed tomography are customarily constructed in combination with a photosensor device and scintillators, the photosensor device detecting the light emitted by the scintillator.

JP 09043356 A describes a detector in which a scintillator is arranged over a light detection panel. Between the scintillator and the light detection panel there is provided a transparent intermediate layer which allows unimpeded passage to the light converted from X-rays. This device utilizes slits which are cut into the scintillator, extend at right angles to the intermediate layer and are filled with an adhesive so as to attenuate crosstalk with neighboring channels by way of total reflection of the light on the slits, a channel being understood to mean a scintillator element with the associated photosensor. The crosstalk due to multiple reflection in the intermediate layer between photosensors and scintillator elements, however, cannot be avoided in this way.

A more essential factor governing the image quality of the CT detectors is the crosstalk between neighboring channels. Crosstalk between the neighboring channels is caused, for example by X-ray fluorescence quanta as well as by optical crosstalk. A detector detects the electromagnetic radiation with an appropriate resolution which is defined by the number of channels. In the case of a corresponding angle of incidence, the visible light rays can be reflected from one channel into a neighboring channel. This induces falsifications in the X-ray image to be formed, because radiation components of one channel are detected in another channel and give rise to an imaging value which does not correspond to reality in the subsequent image.

The crosstalk caused by X-ray fluorescence quanta can be prevented by providing suitable X-ray absorbers between the individual scintillator elements. Optical crosstalk, however, is caused by the light which is generated in the scintillator and is either transmitted directly into the neighboring scintillator element or reaches the neighboring photosensor by multiple reflection in the intermediate layer between the photosensors and the scintillator elements.

Optical crosstalk is prevented according to the present state of the art by fitting the absorber plates between neighboring scintillator elements in grooves which are etched so as to extend between the individual photosensors in the silicon wafer, so that the absorbers also divide the intermediate layer. However, this is possible only in the case of comparatively large linear detector structures.

OBJECTS AND SUMMARY OF THE INVENTION

Therefore, it is an object of the invention to provide a device in which the optical crosstalk due to multiple reflection in the intermediate layer is prevented.

This object is achieved in that at least parts of an intermediate layer contain substances absorbing electromagnetic radiation.

A scintillator consists of a plurality of scintillator elements or scintillator crystals. The photosensor device includes at least one photosensitive element or one photosensor for each scintillator element. The photosensor device detects the light emitted by the scintillator elements.

The crosstalk due to X-ray fluorescence quanta is prevented by the insertion of molybdenum plates or plates of another suitable metal, for example tantalum or lead, as absorbers between the scintillator elements. These absorbers also prevent direct optical crosstalk between the individual scintillator elements, but not indirect crosstalk in the intermediate layer.

The described method, where the absorbers also subdivide the intermediate layer by way of etched grooves in the silicon wafer, cannot be used for two-dimensional detectors. It is not possible to realize an exact two-dimensional metal grid structure and, moreover, it is not possible either to etch grooves into the silicon chip for small pixels of from 1 to 2 $mm^2$ in CMOS chips, because the silicon surface must be available to photosensors and read-out structures.

The X-rays incident on the scintillator elements are converted into visible light rays and ideally reach, via an intermediate layer provided between the scintillator elements and the photosensor device, directly the photosensor arranged underneath the relevant scintillator element. Light quanta which do not reach the photosensor arranged underneath the scintillator element but are transmitted to a neighboring channel, for example, by multiple reflection on the transitional layers, falsify the X-ray image to be formed. The path traveled by such light components contributing to the crosstalk is substantially longer than the path traveled by the direct light rays to the photosensor arranged therebelow. Therefore, substances absorbing electromagnetic radiation are added to the intermediate layer, which substances prevent the light components contributing to the crosstalk from being transmitted into the neighboring channel during their longer travel.

The detector, used notably as an X-ray detector or as a CT detector, includes an intermediate layer which is preferably formed as an adhesive layer. A plurality of scintillator crystals or scintillator elements, subdivided by absorbers, are combined for the scintillator. These scintillator elements are connected to the photosensor layer arranged therebelow by means of the intermediate layer. The use of an adhesive enables a reliable coupling to be effectively realized between the scintillator elements and the relevant associated photosensors, thus enabling a high detector signal.

Carbon black is preferably mixed with the adhesive as the absorbing substance. The carbon black component should be selected to be such that the attenuation of the light during its passage along the direct path through the intermediate layer to the photosensor is comparatively low. The attenuation of the light traveling the longer path to a neighboring photosensor, however, is significantly higher.

The distribution of the absorbing substance may be limited to parts of the intermediate layer, be it that the manufacturing costs are thus increased. Preferably, a uniform distribution of the absorbing substance throughout the intermediate layer is realized.

The intermediate layer according to the invention, containing substances absorbing electromagnetic radiation, significantly reduces the cost of manufacture of a detector, because it is not necessary to use specially structured silicon chips and individual scintillator elements and absorber plates so as to manufacture a detector with a correspondingly improved crosstalk behavior. This simple, economical method of manufacture does not require a complex mask technique which would otherwise have to be used so as to provide structured black absorber layers between the individual scintillator elements and in the intermediate layer.

The object is also achieved by means of an adhesive which contains substances absorbing electromagnetic radiation and serves to connect scintillators and a photosensor device of a detector for the detection of electromagnetic radiation.

The invention also relates to a computer tomograph which includes an X-ray source for emitting an X-ray beam which is rotatable about a system axis, an arithmetic unit for calculating images of an object to be examined while utilizing the detector signals formed with different projections, as well as a detector which is struck by the X-ray beam and includes scinitillators, a photosensor device and an intermediate layer, substances absorbing electromagnetic radiation being present in at least parts of the intermediate layer.

BRIEF DESCRIPTION OF THE DRAWINGS

An embodiment according to the invention will be described in detail hereinafter with reference to FIG. 1.

FIG. 1 shows a detector 1 for the detection of electromagnetic radiation. The detector 1 consists of a plurality of scintillator elements $S_1$–$S_5$ which are separated from one another by respective absorbers 4 which are oriented perpendicularly to the direction of incidence of the electromagnetic radiation. Over the scintillator elements SI-$S_5$ there is provided a reflector layer 2, for example consisting of a layer of $TiO_2$ in lacquer; this layer does not interfere with the incident electromagnetic radiation, for example X-rays 6. The reflector layer 2 prevents light quanta which have already been converted from X-rays 6 from emanating in this direction. The light quanta 9 converted from the X-rays 6 are also reflected by the absorbers 4, so that ultimately they are conducted to a photodiode $F_1$–$F_5$ arranged therebelow. The intermediate layer 10 is arranged between the scintillator elements $S_1$–$S_5$ and the photodiodes $F_1$–$F_5$ provided on a silicon substrate 7. This intermediate layer 10 contains a carbon black component which attenuates the incident light rays 9 underway from a scintillator element, for example $S_1$, to the neighboring photodiode $F_2$. The carbon black component is chosen to be such that the optical absorption for the coupling-in of the photons into the photodiode $F_1$, situated underneath the scintillator element $S_1$, takes place without a significant absorption loss, whereas the absorption along the significantly longer path to the neighboring photodiode $F_2$ suffices so as to achieve a strong reduction of the optical crosstalk.

DESCRIPTION OF THE PREFERRED EMBODIMENTS

Figure 1:
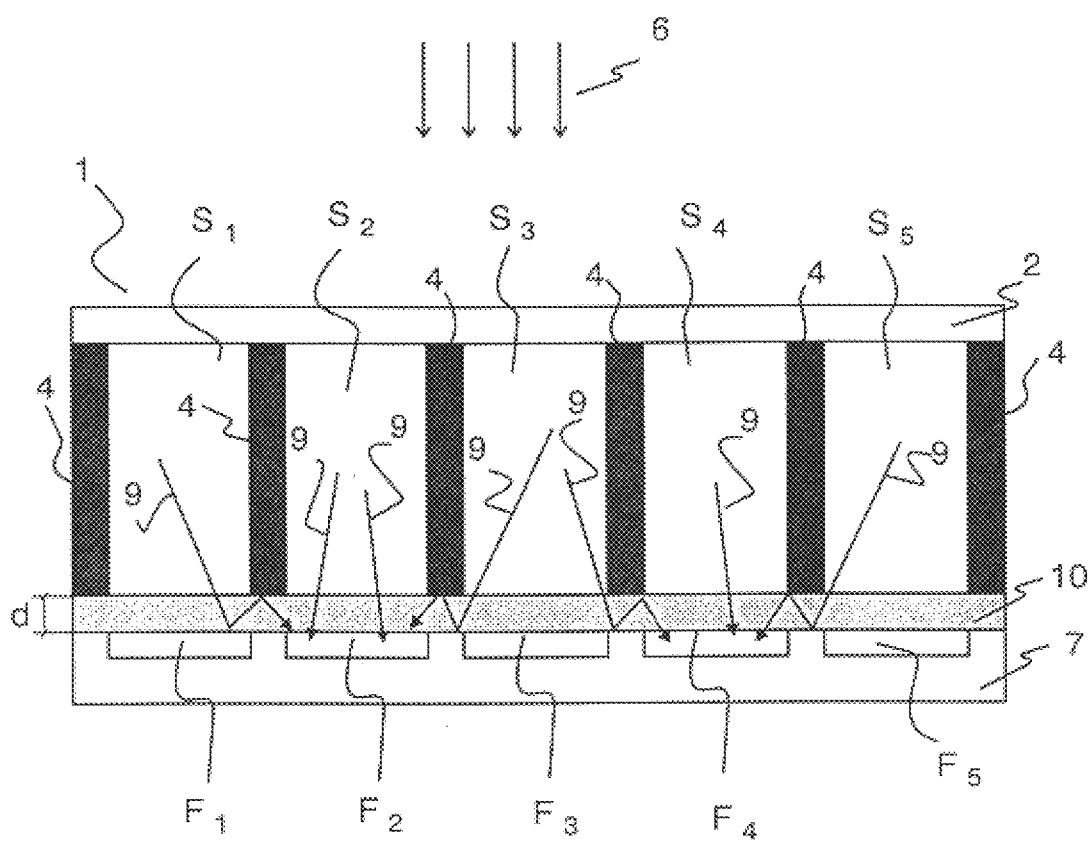
FIG. 1 is a schematic diagram showing the construction of a detector of the invention.

Special photodiodes of crystalline silicon can be used as the photosensors, individual scintillator elements being glued thereon. The scintillator elements are preferably realized as cadmium tungstenate ($CdWo_4$) or ceramic elements based on gadolinium oxysulphide.

Photodiodes $F_1$–$F_5$ have a length of, for example from 20 to 30 mm and a width of 1 mm and are manufactured as a module with approximately 20 diodes on a silicon chip. In the case of two-dimensional detector arrangements such modules consist of a plurality of individual diodes which have typical dimensions of from 1 to 2 mm and are formed on a crystalline silicon chip, for example a CMOS chip.

The intermediate layer between the scintillator elements $S_1$–$S_5$ and the photodiodes $F_1$–$F_5$ preferably has a thickness of from 5 to 10 $\mu$m (thickness d) and the absorbers between the detector elements have a width of from 100 to 200 $\mu$m.

When an adhesive having an optical absorption length of 200 $\mu$m for the light emanating from the scintillator elements is used, the attenuation of the light amounts to approximately 5% during its travel through the 10 $\mu$m intermediate layer from the scintillator to the photodiode arranged therebelow, and to approximately 10% while taking into account the isotropically emitted light. For a thickness of the intermediate layer of 5 $\mu$m the transmission loss amounts to only from 2.5 to 5%. However, the light quanta reaching the neighboring photodiode by multiple reflection in the intermediate layer along an optical path of from 150 to 300 $\mu$m are attenuated by from 50 to 78%. Overall, the signal amplitude of the signal read by the photosensors is hardly reduced by this step, whereas the optical crosstalk is reduced by a factor of from 2 to 5. In the case of one-dimensional and two-dimensional CT detectors, use can be made of standard CMOS chips for the photodiodes and also of arbitrary devices of scintillator elements with intermediate absorber laminations, being connected by the adhesive containing the absorbing substances, without the image quality being degraded by the severe optical crosstalk induced by the customary gluing method utilizing a highly transparent adhesive, for example epoxy resin.

Detectors of this kind are used, for example in computer tomographs. In these computer tomographs an X-ray tube is arranged so as to face the detector. The object to be examined is positioned on a table which is moved to a position between the X-ray tube and the detector. The X-ray tube and the detector are mounted on a circular portal frame which rotates about the object and acquires several projections of the object. An image processing unit computes an image from such a plurality of projections. The intermediate layer provided in the detector in order to connect the scintillator to the photosensor device contains absorbing substances which reduce the optical crosstalk in the intermediate layer.

An intermediate layer of this kind can also be advantageously used for large-area flat X-ray detectors.

What is claimed is:

1. A detector for the detection of electromagnetic radiation, including a plurality of scintillators, a photosensor device comprising a plurality of photodiodes each of which corresponds to each scintillator of said plurality of scintillators and an intermediate layer, wherein at least parts of the intermediate layer contain substances absorbing electromagnetic radiation such that radiation emitted from a scintillator and 1) impinging upon a corresponding photodiode disposed below said scintillator is attenuated up to 10%, and 2) impinging upon a photodiode neighboring said corresponding photodiode is attenuated from about 50 to about 78%.

2. A detector as claimed in claim 1, wherein the intermediate layer consists of an adhesive.

3. A detector as claimed in claim 2, wherein the adhesive contains a carbon black component which attenuates the electromagnetic radiation, upon its passage through the intermediate layer, by a factor which is dependent on the carbon black component in relation to the thickness d of the intermediate layer.

4. A detector as claimed in claim 2, wherein the adhesive contains a carbon black component which attenuates the electromagnetic radiation, upon its passage through the intermediate layer, by a factor which is dependent on the carbon black component in relation to the thickness d of the intermediate layer.

5. A detector as claimed in claim 1, wherein the intermediate layer contains uniformly distributed substances absorbing electromagnetic radiation.

6. A detector for the detection of electromagnetic radiation, including scintillators, a photosensor device and an intermediate layer, wherein at least parts of the intermediate layer contain substances absorbing electromagnetic radiation and wherein the intermediate layer is constructed so as to have a thickness of from 2 to 20 μm and that the electromagnetic radiation is attenuated by from 5% to 20% upon its direct passage through the intermediate layer.

7. A computer tomograph, which includes: an X-ray source for emitting an X-ray beam which is rotatable about a system axis, an arithmetic unit for calculating images of an object to be examined while utilizing the detector signals formed with different projections, and a detector (1) which is struck by the X-ray beam and includes a plurality of scintillators, a photosensor device comprising a plurality of photodiodes and an intermediate layer, wherein substances absorbing electromagnetic radiation are present in at least parts of the intermediate layer such that radiation emitted from a scintillator and 1) impinging upon a corresponding photodiode disposed below said scintillator is attenuated up to 10%, and 2) impinging upon a photodiode neighboring said corresponding photodiode is attenuated from about 50 to about 78%.

8. A detector for the detection of electromagnetic radiation, including scintillators, a photosensor device and an intermediate layer containing an adhesive, wherein at least parts of the intermediate layer contain substances absorbing electromagnetic radiation and wherein the intermediate layer is constructed so as to have a thickness of from 2 to 20 μm and that the electromagnetic radiation is attenuated by from 5% to 20% upon its direct passage through the intermediate layer.

9. A detector for the detection of electromagnetic radiation, including scintillators, a photosensor device and an intermediate layer containing an adhesive, wherein at least parts of the intermediate layer contain substances absorbing electromagnetic radiation, wherein the adhesive contains a carbon black component which attenuates the electromagnetic radiation, upon its passage through the intermediate layer, by a factor which is dependent on the carbon black component in relation to the thickness d of the intermediate layer and wherein the intermediate layer is constructed so as to have a thickness of from 2 to 20 μm and that the electromagnetic radiation (9) is attenuated by from 5% to 20% upon its direct passage through the intermediate layer.

10. A detector for the detection of electromagnetic radiation, including scintillators, a photosensor device and an intermediate layer containing an adhesive, wherein at least parts of the intermediate layer contain substances absorbing electromagnetic radiation, wherein the adhesive contains a carbon black component which attenuates the electromagnetic radiation, upon its passage through the intermediate layer, by a factor which is dependent on the carbon black component in relation to the thickness d of the intermediate layer and wherein the intermediate layer is constructed so as to have a thickness of from 2 to 20 μm and that the electromagnetic radiation is attenuated by from 5% to 20% upon its direct passage through the intermediate layer.

\* \* \* \* \*